United States Patent [19]

Sargent et al.

[11] Patent Number: 4,906,033
[45] Date of Patent: Mar. 6, 1990

[54] RV DOOR ASSEMBLY

[75] Inventors: Charles L. Sargent; John M. Antos, both of Ann Arbor, Mich.

[73] Assignee: Thetford Corporation, Ann Arbor, Mich.

[21] Appl. No.: 266,398

[22] Filed: Nov. 2, 1988

[51] Int. Cl.⁴ ............................................. F05C 1/12
[52] U.S. Cl. .................................. 292/3 S; 16/366; 296/37.1; 292/DIG. 43; 292/254
[58] Field of Search ............... 276/24.1, 24.2, 37.1; 49/395; 16/366; 292/35, 36, 30, 254, 255, DIG. 43, 139, DIG. 17

[56] References Cited

U.S. PATENT DOCUMENTS

| | | | |
|---|---|---|---|
| 2,229,321 | 1/1941 | Bauer et al. | 292/DIG. 43 X |
| 2,608,428 | 8/1952 | Allen | 292/DIG. 43 X |
| 2,680,639 | 6/1954 | Vigmostao | 292/DIG. 43 X |
| 2,688,865 | 9/1954 | Foster et al. | 292/DIG. 43 X |
| 3,134,603 | 5/1964 | Rogers | 296/37.1 |
| 3,183,548 | 5/1965 | Speakman | 16/366 |
| 4,266,816 | 5/1981 | Mukai et al. | 292/DIG. 43 X |
| 4,350,384 | 9/1982 | Yasuda | 292/DIG. 43 X |
| 4,549,671 | 10/1985 | Fay, III | 16/366 X |

Primary Examiner—Gary L. Smith
Assistant Examiner—Eric K. Nicholson
Attorney, Agent, or Firm—Harness, Dickey & Pierce

[57] ABSTRACT

A door assembly for an outside compartment in a recreational vehicle consisting of a generally upright rectangular frame member defining an access opening and a rectangular door member of a size to fit in the opening. Hinge members mount the upper end of the door member on the frame for up and down swinging movement between an open position disposed above the access opening and a closed position fitting in the opening. A continuous seal carried by the door engages the frame in order to maintain the compartment water tight. Separate latching and locking functions are incorporated in the door assembly and are separately accessed from side-by-side latch and lock members in the frame at a convenient position above the door.

14 Claims, 5 Drawing Sheets

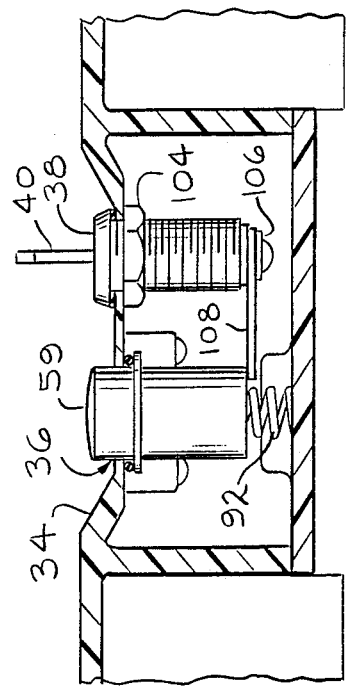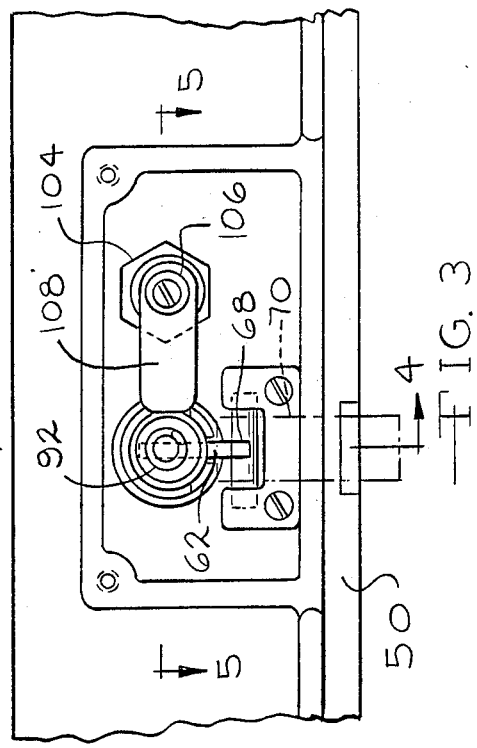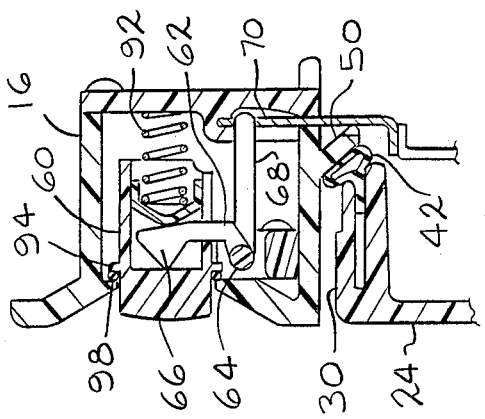

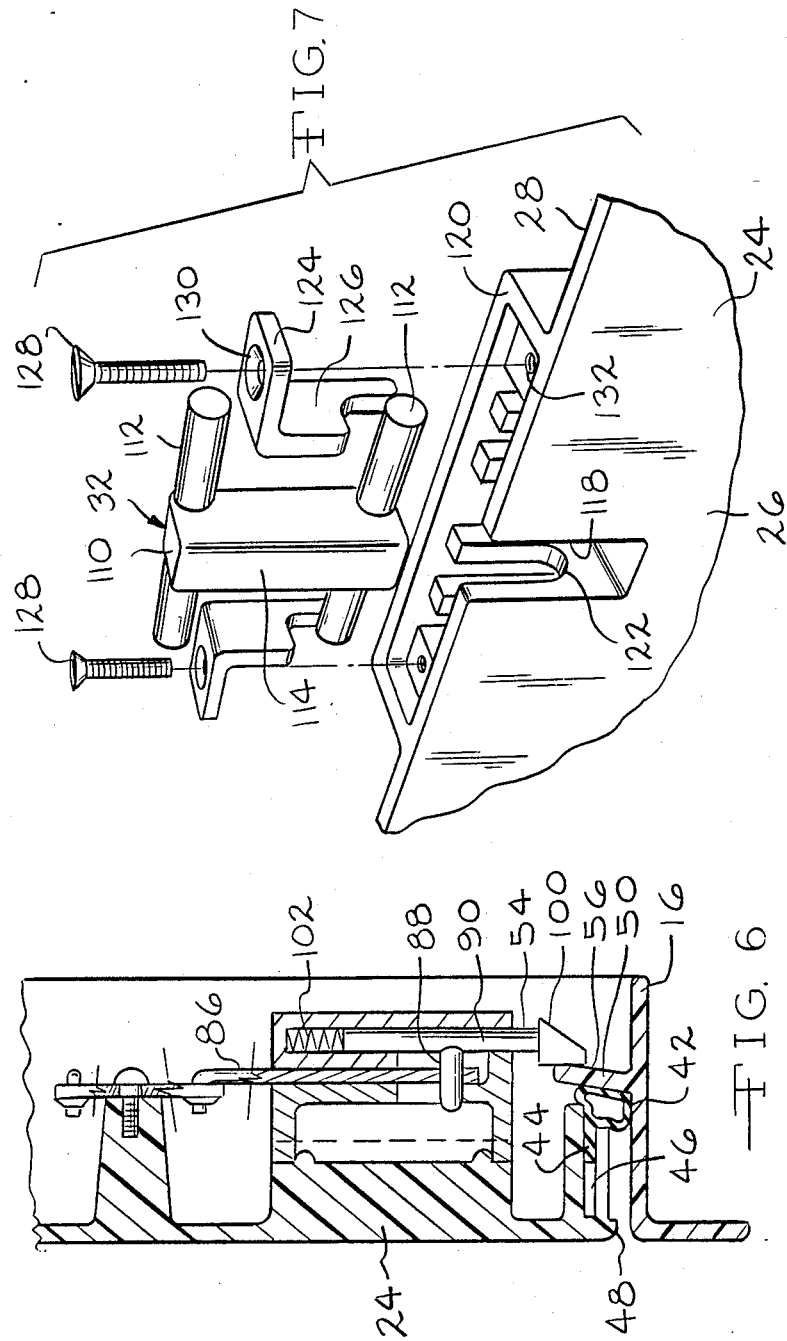

RV DOOR ASSEMBLY

BACKGROUND OF THE INVENTION

This invention relates generally to hinged doors for closing off and providing access to compartments and more particularly to an improved door assembly for a compartment in a recreational vehicle which is to be accessed from outside the vehicle.

Conventional doors for external compartments in recreational vehicles have been very rudimentary in nature, difficult to open and close, not at all weather tight, and somewhat unsightly. As a result, articles stored in RV compartments, such as luggage and cargo, are subject to weather damage, are likely to become soiled during transit and are subject to theft and vandalism.

Furthermore, conventional doors are often unattractive and tend to detract from the overall appearance of the RV.

It is the principal object of the present invention, therefore, to provide an improved door assembly for an outside compartment in a recreational vehicle which is weather tight, is easy to open and close, has separate latching and locking functions conveniently located to compartment users and does not detract from the appearance of the recreational vehicle.

SUMMARY OF THE INVENTION

The door assembly of this invention consists principally of a generally upright rectangular frame member defining an access opening and a rectangular door member of a size to fit in the opening. The door is hingedly mounted on the frame for up and down swinging movement between an open position disposed above the access opening and a closed position fitting in the opening. A continuous seal extends around the opening and is mounted on the door so that when the door is closed the seal is compressed against the frame. As a result, the seal, which is formed of a yieldable material, when compressed, exerts an outwardly directed force on the door tending to move the door toward its open position.

A latching structure on the inside of the door engages the frame to maintain the door in a closed position. When the latch is released, the seal expands and moves the door outwardly at its bottom end so that it can readily be grasped and moved upwardly to its open position. A latch release member is movably mounted on the frame at a position above the door member and is operable to release the latch structure to enable the compressed seal to expand and urge the door member at its lower end to its open position. A separate lock member is associated with the latch release member so that, when desired, the door can be locked in its closed, latched position. The embodying of that latching and locking features in separate structures enables the door to be opened and closed at will without the necessity for a key but also enables locking of the door in its closed position for security purposes.

The latch release member and the lock member are conveniently arranged side-by-side on the frame at a position above the door where they can readily be used by a person desiring access to the compartment.

Special hinge members are provided for hingedly mounting the upper end of the door on the frame. These hinge members enable the door to be moved to an open position located above the door frame and in a plane substantially parallel to the door frame. In addition, the hinge members can be embodied in the door assembly so that only small portions of the hinge members are visible from outside the recreational vehicle to thereby avoid the undesirable result of having the door assembly detract from the overall appearance of the recreational vehicle. Further, a unique latch operating mechanism is mounted on the inside of the door so that the door and frame assembly can be supplied as a unit to RV manufacturers.

The overall result is an improved door assembly which provides desired results and also provides a clean appearance which does not detract from the overall appearance of the recreational vehicle in which it is installed.

Further objects, features and advantages of the invention will become apparent from a consideration of the following description and the appended claims when taken in connection with the accompanying drawing in which:

FIG. 3 is a fragmentary elevational view of the door latching and locking actuators in the door assembly of this invention as viewed from the inward side of the door;

FIG. 4 is a fragmentary sectional view of the latch actuator as seen from substantially the line 4—4 in FIG. 3;

FIG. 5 is a sectional view of the latching and locking actuators shown in FIG. 3 as viewed from substantially the line 5—5 in FIG. 3;

FIG. 6 is an enlarged fragmentary sectional view of a portion of the latching mechanism in the door assembly of this invention as seen from substantially the line 6—6 in FIG. 2;

FIG. 7 is a fragmentary exploded perspective view of a hinge assembly in the door assembly of this invention.

SPECIFICATION

Figure 1:
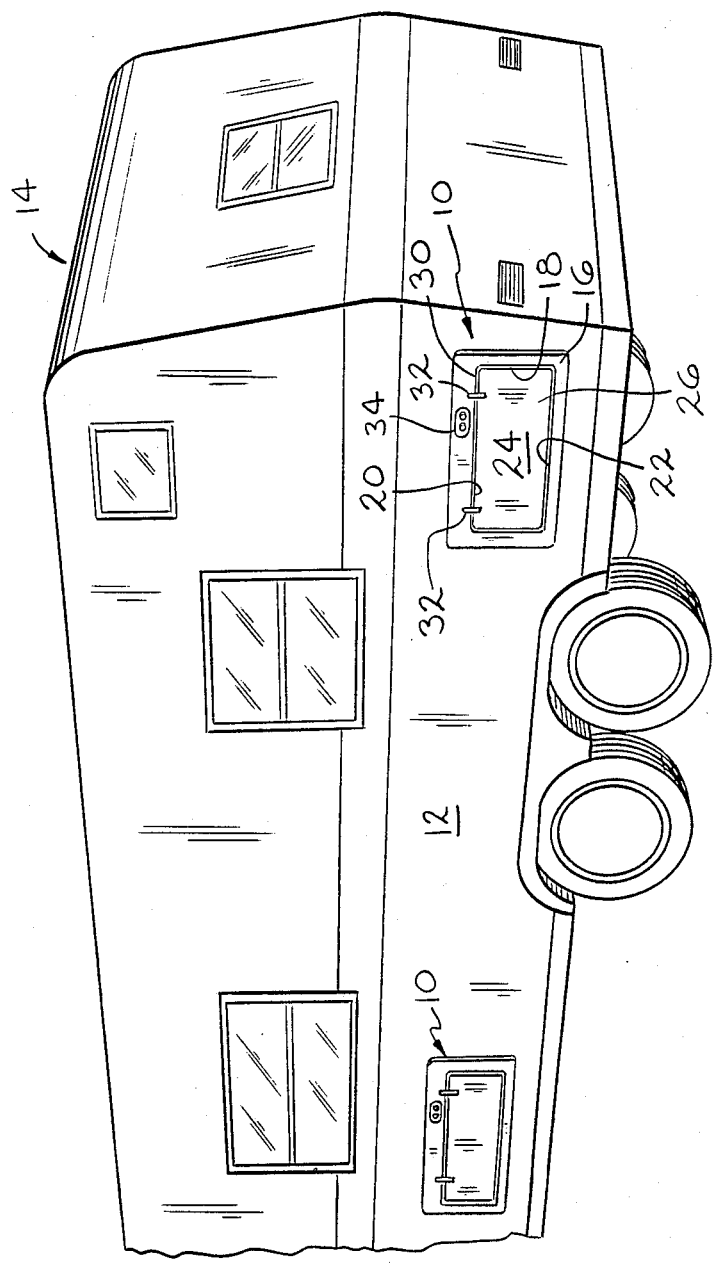
FIG. 1 is a fragmentary perspective view of a portion of an RV equipped with a pair of the door assemblies of this invention.

With reference to the drawing, a pair of door assemblies of this invention, indicated generally at 10, are illusrated in FIG. 1 mounted in a side wall 12 of a recreational vehicle 14 which can either be a motor home or a travel trailer. The doors 10 provide access from outside the vehicle 14 to compartments which can be used for storage of cargo, luggage or the like or other similar purposes. A recreational vehicle (RV) in common use today can have as many as ten such doors 10 or can have a fewer number. In any event, the door assemblies 10 provide access to internal compartments and perform a useful and necessary function in the day-to-day use of the RV 14.

A door assembly 10 consists principally of an upright rectangular frame 16 provided with a rectangular access opening 18 having an upper end 20 and a lower end 22. The door assembly 10 also includes a rectangular door 24 having an outer side 26 and an inner side 28 (FIG. 2) and of a size to fit in the rectangular opening 18.

Figure 8:
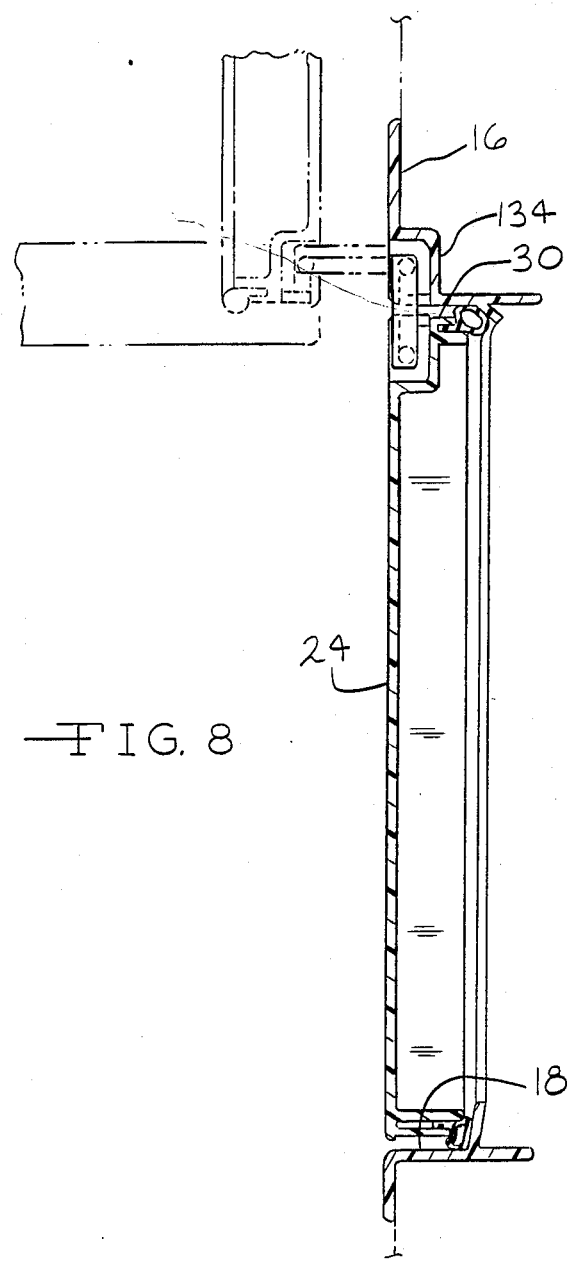
FIG. 8 is a vertical sectional view of the door assembly of this invention illustrating the door in both its open and closed positions.

At its upper end 30, the door 24 is mounted on hinges 32 carried by the frame 16 so that the door 24 can be moved from its closed position shown in FIG. 1 to an upwardly extending open position illustrated in broken lines in FIG. 8.

The frame 16, at a position above the door 24, is provided with a recess 34 in which a latch release member 36 is mounted in a side-by-side relation with a conventional lock member 38 operable by a key 40. As a result, the door 34 can be released from a latched closed position by merely actuating the latch release member 36 and the door 24 can be locked in a closed position or unlocked by merely actuating the lock member 38 with the key 40. The members 36 and 38 are conveniently located at a position above the door 24 and the embodiment of the latching and locking functions in the separate members 36 and 38 makes it unnecessary to continually use the key 40 in order to obtain access to the compartment behind the door 24.

Figure 2:
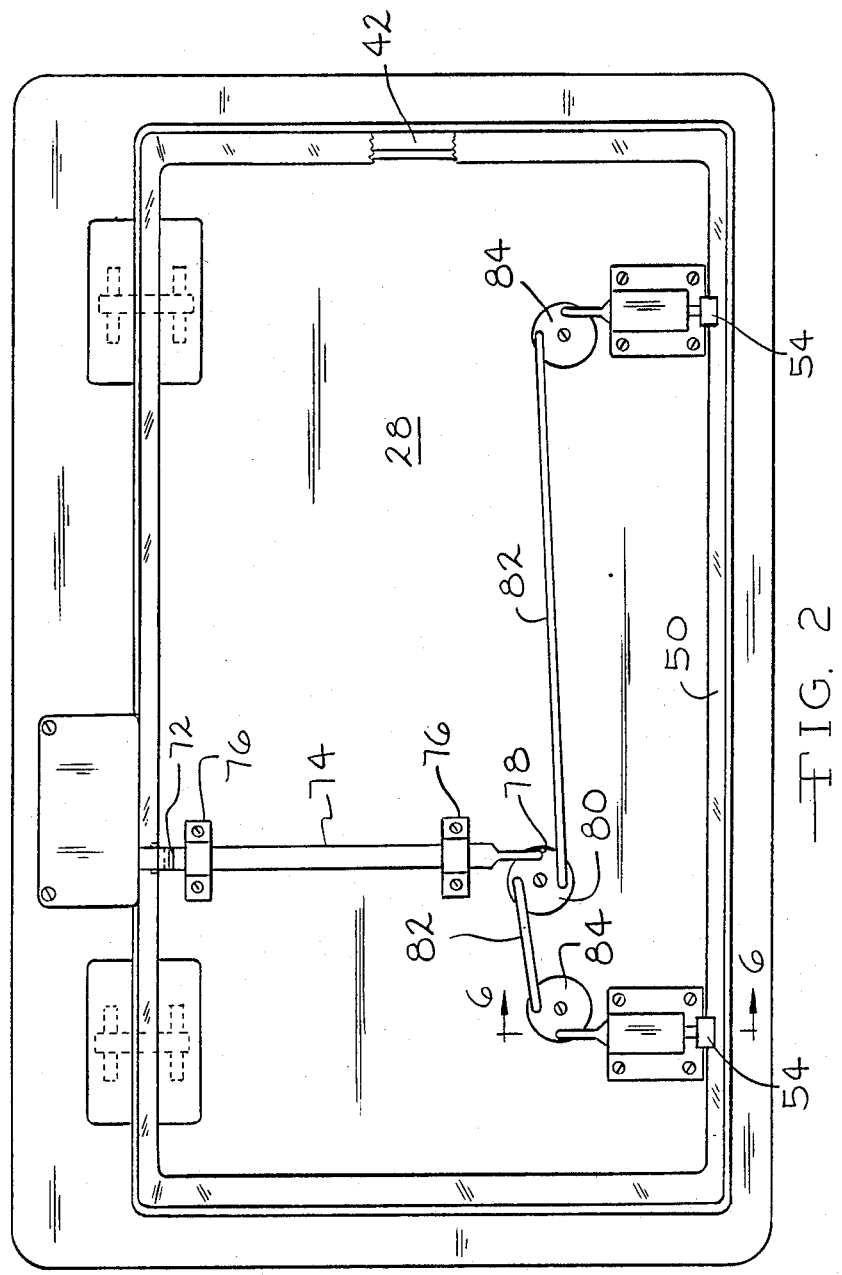
FIG. 2 is an elevational view of the inward side of the door assembly of this invention.

As shown in FIG. 2, a seal member 42 extends continuously around the border of the door member 24 on the inside 28 of the door. The seal member 42 is hollow and is formed of a resilient material with a retaining leg 44 being retained in a retaining slot 46 formed in the door 24 adjacent its peripheral edge 48 (FIG. 6).

As shown in FIGS. 4 and 6, the frame 16 is formed with a continuous inwardly extending flange 50 which, in the closed position of the door 24, is positioned to engage the seal member 42. The flange 50 is inclined, particularly at the top of the door 24 so that the seal 42 will abut the flange 50 rather than slide over the flange 50 as the door 24 is being closed. The engagement of the seal member 42 with the flange 50 provides for a weather tight and water tight engagement of the door 24 with the frame 16 when the door 24 is in its closed position. This insures the security of the contents of the compartment which is closed by the door 24.

As a result of the resilience of the seal 42, when the door 24 is fully closed and latched in a closed position, the seal 42 is compressed, as shown in FIGS. 4 and 6, so that the seal 42 exerts an outwardly directed force on the door 24 tending to open the door. The door 24 is retained in its latched closed position by a pair of latch members 54 (FIGS. 2 and 6) which are carried by the door and engage the inner side 56 of the flange 50 at the lower end 22 of the door opening 20 to maintain the door in a closed position. When the latch members 54 are released from the flange 50, the seal member 42 will start to decompress and expand so as to push the door 24 toward an open position at the lower end 22 of the opening 20. As a result, the user desiring access to the compartment closed by the door 24 can readily grasp the lower edge 48 of the door and move the door from its closed position upwardly to its open position in FIG. 8.

The latch members 54 are released by the application of manual thumb pressure on an actuating button portion 59 of the latch release member 36. Such pressure is operable to move a tubular body portion 60 of the member 36 inwardly of the door frame 16 to in turn rotate a bell crank member 62 in a clockwise direction (FIG. 4) about its supporting pivot 64. The bell crank member 62 has one leg 66 which is engaged with the member 36 and a second leg 68 which engages a downwardly extending actuator rod 70. The rod 70 projects into the door opening 20 where it is engagable with the upper end 72 (FIG. 2) of an upright post member 74 slidably mounted in bearing members 76 mounted on the inner side 28 of the door member 24. The post member 74 forms part of a latch operating mechanism 75 mounted on the inner side 28 of the door 24. At its lower end 78, the post member 74 is pivotally connected to a rotary force transmitting member 80 which is secured at diametrically opposite points to tension members 82 which extend in opposite directions from the member 80. At their opposite ends, the tension members 82 are pivotally connected to rotary members 84 that are rotatably mounted on the inner side 28 of the door 24.

The rotary members 84 are also pivotally connected to downwardly extending actuators 86 (FIG. 6) which are in turn connected by pins 88 to spring pressed slide shafts 90 on which the latch members 54 are mounted. As a result, when the latch release member 36 is pushed inwardly by thumb pressure on the outer button portion 59, the bell crank member 62 is actuated to move the member 70 downwardly to in turn push the post 74 downwardly to rotate the force transmitting member 80 in a clockwise direction to place the tension members 82 in tension to in turn rotate the members 84 in a direction to lift the latch members 54 into release positions in which they are in a clearance relation with the flange 50 at the lower end 22 of the opening 20.

As soon as thumb pressure on the latch release member 36 is released, a compression spring 92 on the door frame 16 applies a force to the latch release member 36 that is effective to move the member 36 back to its set position illustrated in FIG. 4 in which a stop 94 on the member 36 engages a stop 98 on the frame 16. The spring 92 maintains the member 36 in its set position until it is again manually moved by thumb pressure as described above.

As shown in FIG. 6, the inner side 100 of each of the latch members 54 is provided with an inclined cam face so that when the door 24 is closed, the cam face 100 will engage the flange 50 at the lower end of the door opening 20 and the latch member 54 will be urged upwardly to a position in which it will clear the flange 50 and a spring 102 will urge the latch member 100 to its latching position behind the flange 50, as shown in FIG. 6.

The lock member 38 is secured to the frame 16 by a conventional nut assembly so that the lock member body 106 is rotatable to a position in which a blocking member or bar 108 on the body 106 is adjacent the inner end of the latch release body portion 60 so as to block inward movement of the body portion 60 to actuate the bell crank 62. In this position of the blocking member 108, the door 24 is locked in a closed latched position. The key 40 is operable in the lock member 38 to rotate the body 106 to a position in which the blocking member 108 is in a clearance relation with the latch release member 36 so that the member 36 can be moved inwardly to actuate the latch operating mechanism 75 to lift the latch members 54.

As shown in FIG. 7, each of the hinge members 32 consists of an upright stem portion 110 which is long and narrow in a vertical direction so as to be relatively unobtrusive from an appearance standpoint when viewing the assembly 10 from outside the vehicle 14. Each hinge member 32 also includes a pair of oppositely extending shaft portions 112 at the upper and lower ends of the stem portion 110. Importantly, the shaft portions 112 are located inwardly of the outer surface 114 of the stem portion 110 so that the shaft portions 112 are positioned rearwardly of the outer surface 26 of the door 24.

As shown in FIG. 7, the assembly of each hinge member 32 with the door 24 is such that the stem portion 110 fits in a rectangular slot 118 in the door 24 so that the surface 114 of the stem portion 110 is flush with the surface 26 of the door 24. The shaft portions 112 are located rearwardly of the door surface 26 and are received in a receptacle 120 formed on the inner side 28 of the door 24. The receptacle 120 has a plurality of generally U-shape journal portions 122 in which the shaft portions 112 are rotatably supported. Cover members 124 have downwardly extending retainer portions 126 which engage the top sides of the shaft portions 112 so as to maintain them in bearing contact with the journal portions 122. Retainer screws 128 are provided for extending through openings 130 in the cover members 124 and into threaded openings 132 in the receptacle 120 for retaining the shaft portions 112 journalled in the receptacles 120.

The lowermost shaft portions 112 on the hinges 32 are journalled on the door 24 adjacent the upper end thereof. The upper shaft portions are similarly journalled in receptacles 134 formed on the frame 16. The result is best illustrated in FIG. 8 wherein it is seen that the door 24 is movable about the upper shaft portions 112 to a substantially horizontal position, shown in broken lines, and subsequently about the lower shaft portions 112 to an upright position disposed above the opening 18 in a substantially parallel relation with the frame 16. Thus, the door 24 is readily released from a latched position by thumb pressure on the latch release member 36 and is then readily grasped at the lower end of the door 24 and moved upwardly to a horizontal position or further upwardly to a vertical position in which full access to the compartment behind the door 24 is provided.

The location of the latch release member 36 at a position above the door 24 provides for a convenient location for opening the door 24 to one standing beside the RV 14. By virtue of the separation of the latching and locking functions between the latch release member 36 and the locking member 38, use of the key 40 is not required at all times in order to place the door 24 in a closed latched position or to open the door 24. However, the locking member 38 is always available in the event locking of the door 24 is desired.

By virtue of the continuous seal 42 and the mounting of the seal 42 on the door 24 so that it moves into sealing engagement with the continuous flange 50, the compartment behind the door 24 is constantly maintained in a weather tight condition so as to protect the contents.

What is claimed:

1. A door assembly for a compartment in a recreational vehicle which is to be accessed from outside the vehicle, said door assembly comprising a generally vertical rectangular frame member defining an access opening having an upper end and a lower end, a rectangular door member having an outer side and an inner side and being of a size to fit in said opening, hinge means mounting said door member on said upper end of said frame for up and down swinging movement of said door between an open position disposed above said opening and a closed position fitting in said opening, substantially continuous seal means extending around said opening at a position between said door member and said frame in said closed position of said door member, said seal means being formed of a yieldable material and being compressed between said door member and said frame in said closed position of said door member, latch means carried by said door member and engageable with said frame member so as to maintain said door member in said closed position, and a movable latch release member mounted on said upper end of said frame at a position above said door member operable to release said latch means to enable said compressed seal means to expand and urge said door member at the lower end of said opening toward an open position.

2. The structure of claim 1 further including a lock assembly arranged in a side-by-side relation on said frame member with said latch release member and operable in one actuated position to block actuation of said latch release member, to thereby enable said door member to be locked in said closed position.

3. The structure of claim 1 wherein said latch release member projects inwardly relative to said door member and is mounted on said frame for inward movement from a set position in response to manual pressure, a pivotally mounted bell crank member mounted on said frame member and engaged with said latch release member so that said crank member is rotated in response to said inward movement of a body portion of said latch release member, and a compression spring assembly mounted on said frame and operatively associated with said latch release member and said bell crank member so as to yieldably resist said inward movement of said body portion and so as to return said latch release member to said set position when said manual pressure is discontinued.

4. The structure of claim 1 wherein said hinge means comprises at least one hinge member mounted on said frame and pivotally engaged with said door member, said hinge member having an upright stem portion and a pair of vertically spaced shaft portions extending in opposite substantially horizontal directions from said stem portion, said stem portion having a front side and said shaft portions being located rearwardly of said front side to enable said hinge member to be mounted on the front side of said door assembly so that only said stem portion is visible from the front side of said door assembly because said shaft portions are located rearwardly of said front side.

5. The structure of claim 4 wherein one of said shaft portions is pivotally mounted on said frame member and the other is pivotally mounted on said door member to thereby enable pivotal upward movement of said door member about both of said shaft portions to an open position in which said door member is substantially parallel to and extends upwardly at a position outwardly of said frame member.

6. The structure of claim 5 wherein said seal means is mounted on said door member and said frame is provided with inwardly extending flange means engageable by said seal means in the closed position of said door member.

7. The structure of claim 6 wherein said flanges are inclined to improve the capability of the flanges to abut said seal means during pivotal closing movement of said door member.

8. The structure of claim 1 further including a latch operating mechanism mounted on the inner side of said door member for operating said latch means in response to actuation of said latch release member, said mechanism comprising an upright post member mounted for up and down movement on said door member, a rotary force transmitting member mounted on said door member and connected to said post member for rotation in response to downward movement of said post member, and at least one tension member connected to said rotary member for transmitting a pulling force to said latch means operable to release said latch means.

9. The structure of claim 5 further including means on said frame and on said door member providing journal receptacles for receiving said shaft portions of said hinge member, and shaft retainer covers for said receptacles maintaining said shaft portions in journaled positions in said receptacles, said covers being releasably secured to said receptacles.

10. A door assembly for a compartment in a recreational vehicle which is to be accessed from outside the vehicle, said door assembly comprising a generally vertical rectangular frame member defining an access opening having an upper end and a lower end, a rectangular door member having an inner side and an outer side and being of a size to fit in said opening, hinge means mounting said door member on said upper end of said frame for up and down swinging movement of said door between an open position disposed above said opening and a closed position fitting in said opening, latch means carried by said door member and engageable with said frame member so as to maintain said door member in said closed position, a movable latch release member mounted on said upper end of said frame at a position above said door member operable to release said latch means to enable said door member to be pivoted outwardly to an open position, and a lock assembly arranged in a side-by-side relation on said frame member with said latch member and operable in one actuated position to block actuation of said latch release member, to thereby enable said door member to be locked in said closed position.

11. The structure of claim 10 wherein said latch release member has an actuating button portion and a body portion projecting inwardly relative to said door member, said body portion being mounted on said frame for inward movement in response to manual pressure on said button portion, and said lock assembly having a blocking member operable in said one position of said lock assembly to block inward movement of said body portion to release said latch means.

12. A door assembly for a compartment in a recreational vehicle which is to be accessed from outside the vehicle, said door assembly comprising a generally vertical rectangular frame member defining an access opening having an upper end and a lower end, a rectangular door member having an outer side and an inner side and being of a size to fit in said opening, hinge means mounting said door member on said upper end of said frame for up and down swinging movement of said door between an open position disposed above said opening and a closed position fitting in said opening, said hinge means comprising a pair of hinge members mounted on said frame and pivotally engaged with horizontally spaced portions of said door member, each of said hinge members having an upright stem portion and a pair of vertically spaced shaft portions extending in opposite substantially horizontal directions from said stem portion, said stem portion having a front side and said shaft portions being located rearwardly of said front side to enable said hinge member to be mounted on the front side of said door assembly so that only said stem portion is visible from the front side of door assembly, said shaft portions are located rearwardly of said front side, one of said shaft portions being pivotally mounted on said frame and the other being pivotally mounted on said door member to thereby enable pivotal upward movement of said door member about both of said shaft portions to an open position in which said door member is substantially parallel to and extends upwardly at a position forwardly of said frame, latch means carried by said door member and engageable with said frame member so as to maintain said door member in said closed position, and a movable latch release member mounted on said upper end of said frame and operable to release said latch means to enable said door member to be pivoted outwardly to an open position.

13. The structure of claim 12 further including means on said frame and on said door member providing journal receptacles for receiving said shaft portions of said hinge members, and shaft retainer covers for said receptacles maintaining said shaft portions in journaled positions in said receptacles, said covers being releasably secured to said receptacles.

14. The structure of claim 12 further including means forming substantially vertically aligned slot means in said frame and the upper end of said doors, said hinges stem portions being positioned in said aligned slot means.

* * * * *